United States Patent
Lee et al.

(10) Patent No.: US 7,604,302 B1
(45) Date of Patent: Oct. 20, 2009

(54) PARKING BRAKE SYSTEM

(75) Inventors: Joohang Lee, Yongin-si (KR);
Hongseop Kim, Ansan-si (KR); Jinhee Lee, Seongnam-si (KR); Wooyeol Kim, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 12/323,437

(22) Filed: Nov. 25, 2008

(30) Foreign Application Priority Data

May 30, 2008 (KR) .................. 10-2008-0050636

(51) Int. Cl.
*F16H 61/12* (2006.01)

(52) U.S. Cl. .................. 303/3; 192/219.4; 192/220.3

(58) Field of Classification Search .................. 303/3, 303/15, 20; 477/92, 94; 192/219.4, 220.3
See application file for complete search history.

(56) References Cited

U.S. PATENT DOCUMENTS

| | | | | |
|---|---|---|---|---|
| 5,310,251 A | * | 5/1994 | Towers et al. | 303/11 |
| 5,630,489 A | * | 5/1997 | Bebernes | 192/219.4 |
| 5,722,517 A | * | 3/1998 | Sayama | 188/353 |
| 5,827,149 A | * | 10/1998 | Sponable | 477/92 |
| 6,311,808 B1 | * | 11/2001 | Halasy-Wimmer et al. | 188/72.6 |
| 6,450,587 B1 | * | 9/2002 | MacGregor et al. | 303/89 |
| 6,802,571 B2 | * | 10/2004 | Ishimaru et al. | 303/3 |

FOREIGN PATENT DOCUMENTS

| | | |
|---|---|---|
| JP | 2007-002955 | 1/2007 |
| KR | 10-2004-0054029 | 6/2004 |
| KR | 10-2006-0054229 | 5/2006 |

* cited by examiner

*Primary Examiner*—Christopher P Schwartz
(74) *Attorney, Agent, or Firm*—Morgan, Lewis & Bockius LLP

(57) ABSTRACT

The parking brake system that restricts or releases a parking gear by using an operational force by hydraulic pressure that is generated or removed according to whether the engine works and an operational force by an electromagnetic force, includes a position valve that outputs operational pressure supplied from a hydraulic pressure supplier, to a pressure control valve corresponding to a shift range including a parking range, a parking releasing valve that outputs operational pressure supplied from position valve at the other shift ranges than a parking range, a main actuator that releases a parking gear when an operational force is transmitted from parking releasing valve and restricts the parking gear when the operational force is removed, and/or a sub-actuator that releases the parking gear by providing an operational force to main actuator only when an engine works.

13 Claims, 1 Drawing Sheet

PARKING BRAKE SYSTEM

CROSS-REFERENCE TO RELATED APPLICATION

The present application claims priority to Korean Application Number 10-2008-0050636 filed May 30, 2008, the entire contents of which application is incorporated herein for all purposes by this reference.

BACKGROUND OF THE INVENTION

1. Field of the Invention

The present invention relates to a parking brake system, particularly a parking brake system that unlocks a parking gear using an operational force converted from hydraulic pressure that is generated when the engine starts and an operational force by an electromagnetic force, and automatically locks the parking gear using an operational force converted from hydraulic pressure that is generated when the engine stops and an operational force by an electromagnetic force.

2. Description of Related Art

In general, a parking brake system in a vehicle, which is provided to secure a safe stop or parking by restricting movement of the vehicle when stopping or parking the vehicle, forcibly restricts the rear wheels as an operation lever is operated.

Further, in vehicles equipped with an automatic transmission, a parking brake system, which can selectively restrict rotation of a parking gear in the transmission as the shift lever is operated, may be used. According to parking brake systems for an automatic transmission in the related art, the parking gear is restricted by an initial force by hydraulic pressure and a locking mechanism that maintains the restriction of the parking gear using magnetization by an electromagnet.

Therefore, in parking brake systems for an automatic transmission in the related art, it is required to use an operational force by hydraulic pressure and an electromagnet and a locking mechanism is additionally needed to maintain restriction of the parking gear by magnetization of the electromagnet. Accordingly, the configuration is complicated and the parking brake systems cannot normally function when any one of the hydraulic system, the mechanical part and the locking part for maintaining the restriction is damaged by magnetization of the electromagnet.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a compact parking brake system restricting or releasing a parking gear by using an operational force converted from hydraulic pressure that is generated or removed according to whether the engine works and an operational force by an electromagnetic force.

Various embodiments of the present invention may selectively use a system when another system is failed, by setting a plurality of operational force systems for transmitting an operational force that restricts or releases the parking gear, into a system for an operational force by hydraulic pressure and a system for an operational force by an electromagnetic force.

A parking brake system according to another aspect of the present invention may include a position valve that selectively outputs operational pressure supplied from a hydraulic pressure supplier, to a pressure control valve corresponding to a shift range including a parking range, by operation of a solenoid valve, a parking releasing valve that receives an operational force from a solenoid valve, the parking releasing valve that operates at other shift ranges than the parking range, and outputs the operational pressure selectively received from the position valve, a main actuator outputting operational force converted from the operational pressure transmitted from the parking releasing valve to release a parking gear, or removing the operational force to restrict the parking gear, a sub-actuator that releases the parking gear by providing an operational force to the main actuator when an engine works, and does not provide the operational force to the main actuator when the engine stops, a sensor that detects whether the main actuator operates or not and outputs the detected result to a shift control unit, and/or a return member that applies a return force to the main actuator to release the parking gear when the operational pressure provided from the parking releasing valve and the operational force provided from the sub-actuator are removed.

The main actuator may be connected with the parking lever to restrict or release the parking gear.

The shift control unit may regulate the solenoid valve of the position valve, the solenoid valve of the parking releasing valve, and the sub-actuator.

The position valve may include a first solenoid valve and a second solenoid valve.

When the engine stops, the operational pressure supplied from the parking releasing valve and the operational force by the sub-actuator may be removed.

The return member may apply a mechanical return force to the main actuator, when the operational pressure provided from the parking releasing valve to the main actuator and the operational force provided from the sub-actuator to the main actuator are both removed, to restrict the parking gear.

The return member may be a spring.

The sub-actuator may be an electronic control actuator that is regulated by the shift control unit.

The sub-actuator may be a hydraulic control actuator that is regulated by the shift control unit.

The shift control unit may selectively regulate the first, second and/or third solenoid.

The hydraulic pressure supplier may include oil pump.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Figure 1:
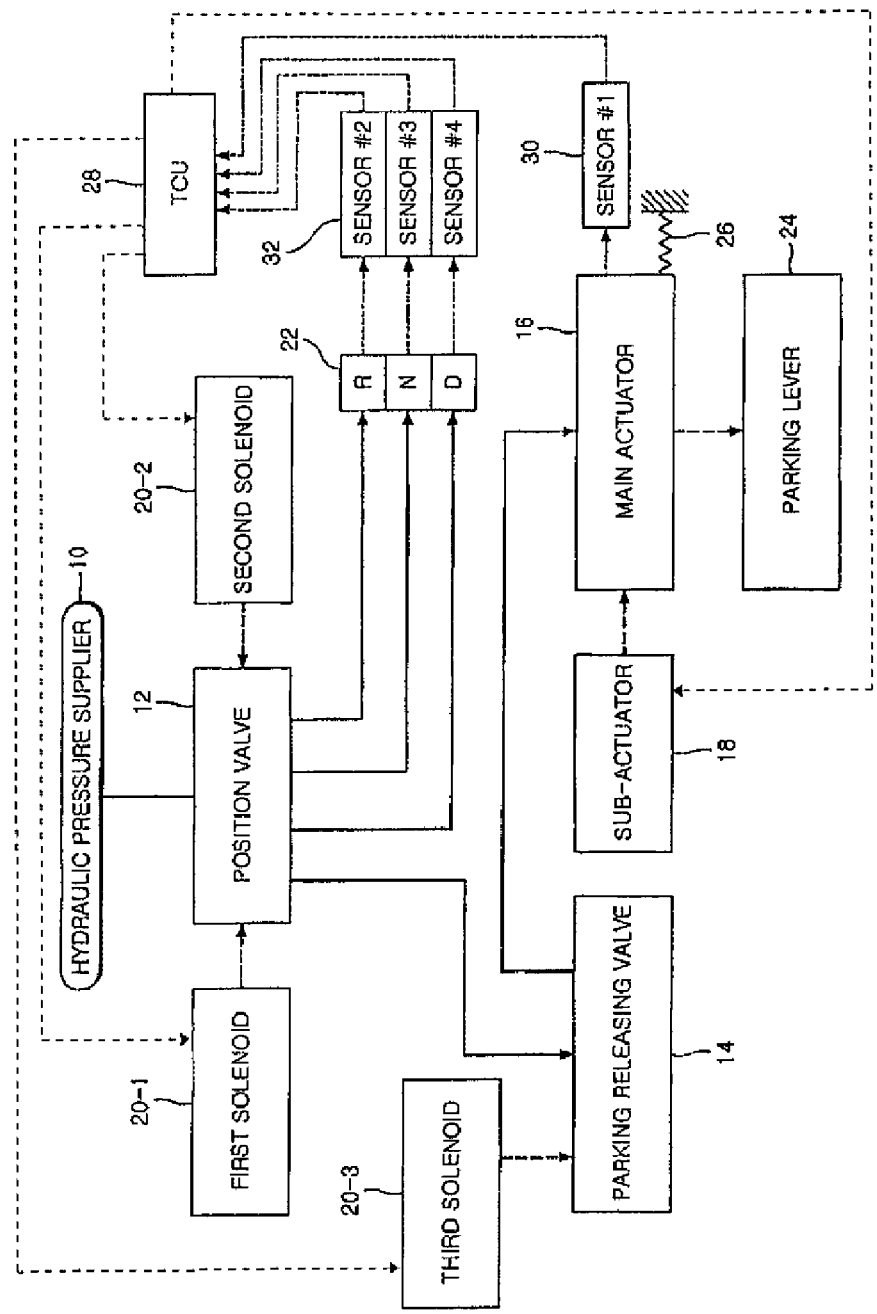
FIG. 1 is a block diagram schematically illustrating an exemplary parking brake system according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A parking brake system according to the invention includes, as shown in FIG. 1, a hydraulic pressure supplier 10, a position valve 12, a parking releasing valve 14, a main actuator 16, and a sub-actuator 18. Hydraulic pressure supplier 10 is driven to supply hydraulic pressure at a predetermined level. Position valve 12 receives an operational pressure from hydraulic pressure supplier 10 and outputs the operational pressure to the outside. Parking releasing valve 14 limitedly receives the operational pressure outputted from position valve 12 only at the other stages than the parking range and outputs operational pressure when the engine starts. Main actuator 16 releases a parking gear using the operational pressure outputted from parking releasing valve 14 to unlock the parking gear. Main actuator 16 locks the parking gear when the operational pressure is removed as the engine stops as explained later.

Sub-actuator 18 releases the restriction of the parking gear by providing an operational force to main actuator 16 only while the engine works and does not provide an operational force to main actuator 16 while the engine stops.

Hydraulic pressure supplier 10 includes, for example, an oil pump that selectively pumps out working fluid while operating, not whether the engine works and a regulator valve that raises pressure of the working fluid pumped out of the oil pump to a predetermined level.

In an exemplary embodiment of the present invention, the position valve 12 selectively outputs the operational pressure supplied from hydraulic pressure supplier 10 into a plurality of hydraulic pressure channels, depending on shift ranges, and is provided with solenoid valve for channel shift. In an exemplary embodiment of the present invention, the position valve 12 is actuated for channel shift by the first and second solenoid valves 20-1, 20-2. However, the number of solenoid valves is not limited if the position valve 12 can be operated for channel shift.

In detail, position valve 12 selectively outputs the operational pressure supplied from hydraulic pressure supplier 10 to parking releasing valve 14 relating to parking or a plurality of pressure control valves 22 relating the shifting by adjusting output channels of the operational pressure according to operations of first and second solenoid valves 20-1, 20-2. The operations of first and second solenoid valves 20-1, 20-2 are controlled by a shift control unit 28 that is described below.

According to this embodiment of the invention, position valve 12 continues providing the operational pressure supplied from hydraulic pressure supplier 10 to parking releasing valve 14 at the other shift ranges (e.g. R, N, and D ranges) than the parking range, and parking releasing valve 14 receives an operational force from a third solenoid valve 20-3 for channel shift that operates at other shift ranges than the parking range and also receives the operational pressure supplied from position valve 12 and releasing the parking gear by outputting the operational pressure to main actuator 16. On the other hand, at the parking range, since third solenoid valve 20-3 does not operate, parking releasing valve 14 does not output an operational pressure to main actuator 16 and correspondingly restricts the parking gear.

Further, position valve 12 independently outputs operational pressure to pressure control valves 22 at the other shift ranges (e.g. R, N, and D ranges) than the parking range to achieve shifting. That is, position valve 12 functions as a kind of manual valve.

Sub-actuator 18 releases the parking gear by supplying an operational force to main actuator 16 when the engine starts, and does not supply an operational force to main actuator 16 to lock the parking gear when the engine stops.

Accordingly, even if main actuator 16 cannot make a normal function for releasing the parking gear when a problem occurs in the hydraulic pressure channel including position valve 12 and parking releasing valve 14, it can release the parking gear using the operational force supplied from sub-actuator 18 that operates when the engine works. That is, sub-actuator 18 is a part to achieve a fail-safe function.

Main actuator 16 is mechanically connected with a parking lever 24 to lock or unlock the parking gear, in which as an operational force is supplied from main actuator 16, parking lever 24 restricts rotation of the parking gear by actuating a parking pall. Further, the parking pall is provided with a return spring that disengages the parking pall from the parking gear when the operational force transmitted from parking lever 24 is removed, which has been known in the related art.

Further, main actuator 16 is provided with an independent return member 26 that releases the parking gear restricted by parking lever 24 while returning to the initial position, when the operational pressure is supplied from parking releasing valve 14 and the operational force is supplied from the sub-actuator 18. Return member 26 may be a mechanical element that can mechanically provide a return force, such as a spring.

Furthermore, main actuator 16 is provided with a sensor #1; 30 that detects whether main actuator 16 operates or not and outputs the detected result to a shift control unit (TCU) 28, in which shift control unit 28 receives the detected result about whether main actuator 16 operates or not from sensor #1; 30 and determines that the parking gear is locked or not at present.

In addition, pressure control valves 22 are also provided with independent sensors #1, #2, #3; 32, in which sensors #1, #2, #3; 32 output to shift control unit 28 whether pressure control valves 22 operate such that shift control unit 28 determines the present condition of shift.

Therefore, when the engine starts, the operational pressure generated from hydraulic pressure supplier 10 is provided to position valve 12, in which when the shift range is one of the other ranges than the parking range, position valve 12 outputs the operational pressure to parking releasing valve 14 by operation of first and second solenoid valves 20-1, 20-2 and parking releasing valve 14 outputs the operational pressure supplied to position valve 12 to main actuator by operation of third solenoid valve 20-3.

As a result, main actuator 16 releases the parking gear by actuating parking lever 24.

In this configuration, sub-actuator 18 can be achieved in a variety of ways. First, sub-actuator 18 may be an electronic control actuator that operated by operational power that is applied by control of shift control unit 28 or may be a hydraulic control actuator that is operated by operational pressure applied by control of shift control unit 28.

In particular, when sub-actuator 18 is the electronic control actuator, sub-actuator operates or not whether the engine works, that is, when the engine works, sub-actuator 18 supplies an operational force by an electromagnetic force to main actuator 16 and the operational pressure transmitted from parking releasing valve 14 to main actuator 16 as described above. Accordingly, the parking gear is always not restricted at the other shift ranges than the parking range, when the engine works, thereby allowing normal traveling.

Further, since sub-actuator 18 makes it possible to achieve the fail-safe function that allows normal traveling, by supplying an operational force by an electromagnetic force to main actuator 16 even if an operational force by hydraulic pressure is not supplied to main actuator 16 due to a problem in the hydraulic pressure channel including position valve 12 and parking releasing valve 14.

Further, when the engine stops, the operational force by the operational pressure supplied from hydraulic pressure supplier 10 to main actuator 16 and the operational force by the electromagnetic force provided from sub-actuator 18 to main actuator 16 are both removed, such that main actuator 16 shift the parking gear to be restricted, by actuating parking lever 24 while returning to the initial position by the return force of return member 26.

According to the parking brake system for an automatic transmission of the invention, it is possible to achieve a compact parking brake system by actuating a parking lever to restrict or release a parking gear, using a hydraulic pressure system that generates or removes hydraulic pressure, depending on whether the engine of a vehicle equipped with an automatic transmission works or not.

Further, according to the invention, since restricting or releasing the parking gear using the parking lever is made in a plurality of ways using the operational force by hydraulic pressure and the operational force by the electromagnetic force, when a problem is generated in the channels of a hydraulic pressure system, the parking gear can be released by the operational force by electromagnetic force that is generated when the engine starts. Accordingly, it is possible to prevent damages due to mis-operation or non-operation of the parking brake system and achieve a fail-safe function as well.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A parking brake system, comprising:
   a position valve that selectively outputs operational pressure supplied from a hydraulic pressure supplier, to a pressure control valve corresponding to a shift range including a parking range, by operation of a solenoid valve;
   a parking releasing valve that receives an operational force from a solenoid valve, the parking releasing valve that operates at other shift ranges than the parking range, and outputs the operational pressure selectively received from the position valve;
   a main actuator outputting operational force converted from the operational pressure transmitted from the parking releasing valve to release a parking gear, or removing the operational force to restrict the parking gear;
   a sub-actuator that releases the parking gear by providing an operational force to the main actuator when an engine works, and does not provide the operational force to the main actuator when the engine stops;
   a sensor that detects whether the main actuator operates or not and outputs the detected result to a shift control unit; and
   a return member that applies a return force to the main actuator to release the parking gear when the operational pressure provided from the parking releasing valve and the operational force provided from the sub-actuator are removed.

2. The parking brake system as defined in claim 1, wherein the main actuator is connected with the parking lever to restrict or release the parking gear.

3. The parking brake system as defined in claim 1, wherein the shift control unit regulates the solenoid valve of the position valve, the solenoid valve of the parking releasing valve, and the sub-actuator.

4. The parking brake system as defined in claim 1, wherein the position valve includes a first solenoid valve and a second solenoid valve.

5. The parking brake system as defined in claim 1, wherein when the engine stops, the operational pressure supplied from the parking releasing valve and the operational force by the sub-actuator are removed.

6. The parking brake system as defined in claim 1, wherein the return member applies a mechanical return force to the main actuator, when the operational pressure provided from the parking releasing valve to the main actuator and the operational force provided from the sub-actuator to the main actuator are both removed, to restrict the parking gear.

7. The parking brake system as defined in claim 1, the return member is a spring.

8. The parking brake system as defined in claim 1, wherein the sub-actuator is an electronic control actuator that is regulated by the shift control unit.

9. The parking brake system as defined in claim 1, wherein the sub-actuator is a hydraulic control actuator that is regulated by the shift control unit.

10. The parking brake system as defined in claim 1, wherein the shift control unit selectively regulates the first, second and/or third solenoid.

11. The parking brake system as defined in claim 1, wherein the hydraulic pressure supplier includes oil pump.

12. A passenger vehicle comprising a parking lever operable by a driver and the parking brake system as defined in claim 1.

13. A passenger vehicle as defined in claim 12, wherein when the engine stops, the operational pressure supplied from the parking releasing valve and the operational force by the sub-actuator are removed.

* * * * *